UNITED STATES PATENT OFFICE.

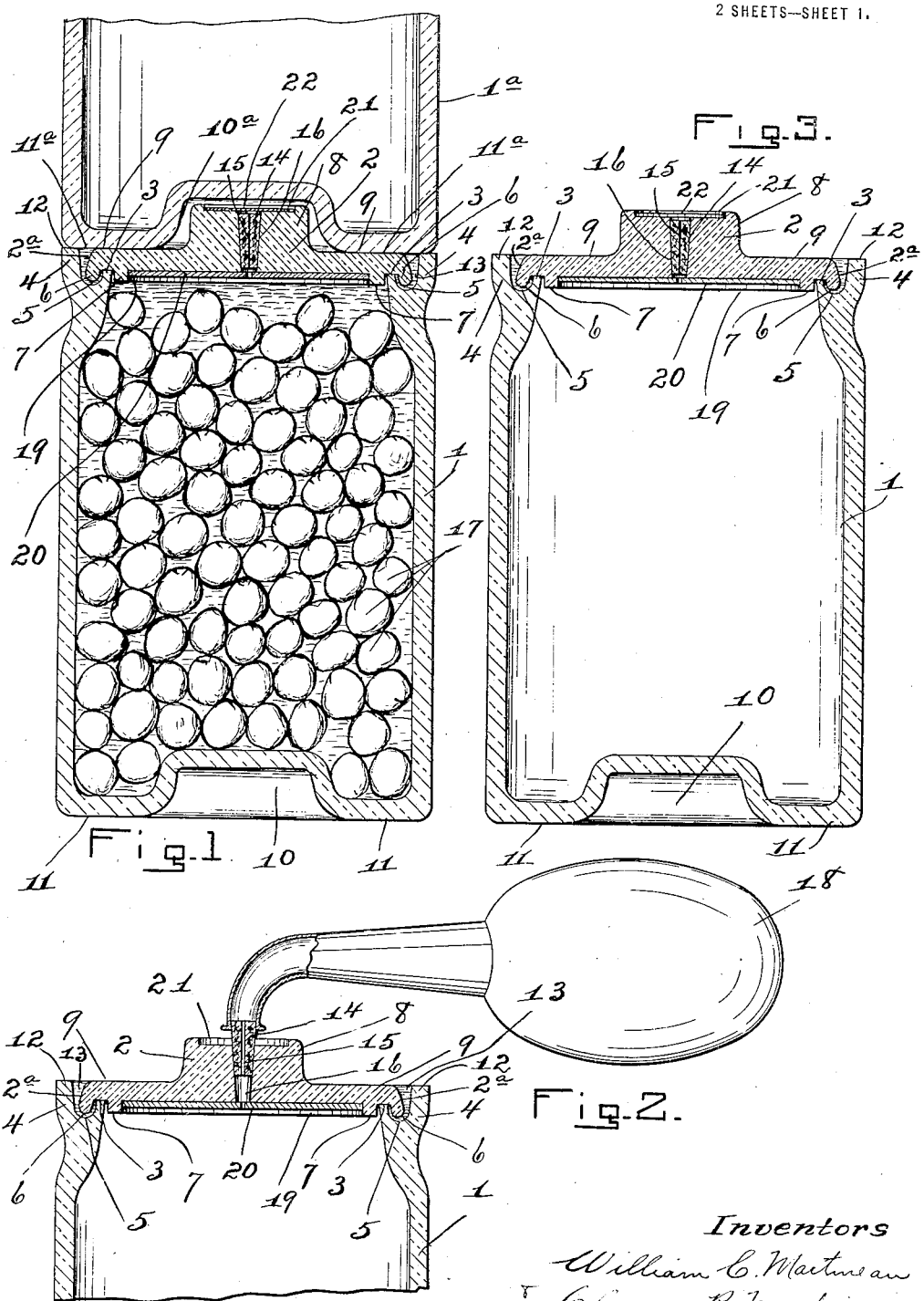

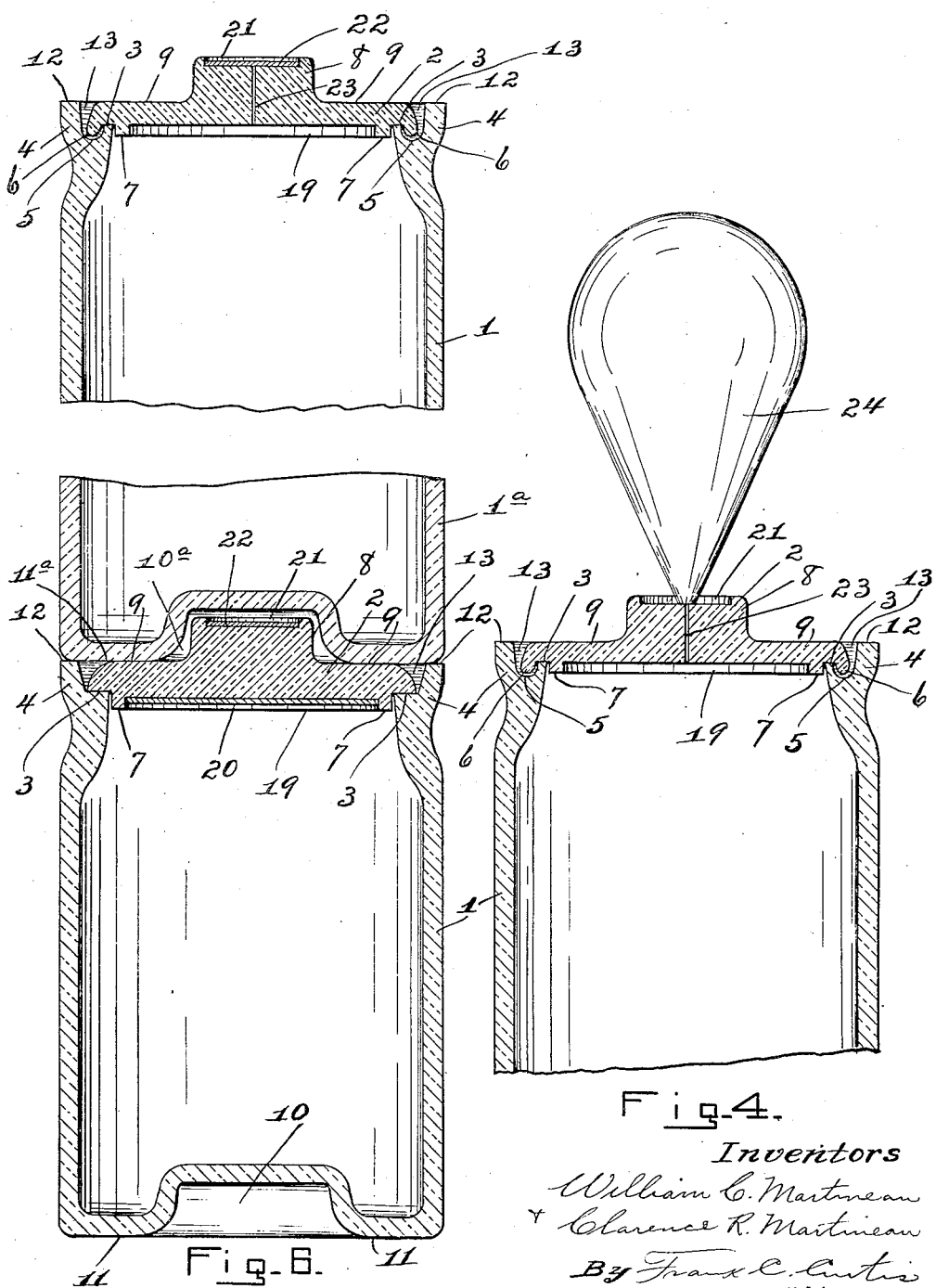

WILLIAM C. MARTINEAU AND CLARENCE R. MARTINEAU, OF ALBANY, NEW YORK.

FRUIT-JAR.

1,336,367.   Specification of Letters Patent.   Patented Apr. 6, 1920.

Application filed June 26, 1917. Serial No. 176,969.

*To all whom it may concern:*

Be it known that we, WILLIAM C. MARTINEAU and CLARENCE R. MARTINEAU, citizens of the United States, residing at Albany, county of Albany, and State of New York, have invented certain new and useful Improvements in Fruit-Jars, of which the following is a specification.

Reference may be had to the accompanying drawings, and the reference characters marked thereon, which form a part of this specification.

The principal object of the invention is to hermetically seal fruit-jars and similar covered containers without the use of packing rings, and without the use of cover-clamping mechanism.

Another object of the invention is to permit of stacking such covered jars or containers one upon another for convenience in storage.

Other objects will appear in connection with the following description.

Figure 1 of the drawings is a central vertical section of a covered fruit-jar embodying our invention, showing the bottom-portion of the body of a similar jar stacked thereupon.

Fig. 2 is a similar sectional view of the covered end of the jar illustrating the manner in which air is exhausted from the covered jar.

Fig. 3 is a similar view, showing the jar finally sealed.

Fig. 4 is a similar view illustrating another manner of exhausting the air from the jar before final sealing.

Fig. 5 is a similar view showing the same jar finally sealed.

Fig. 6 is a view similar to Fig. 1, showing a modified form of our invention.

Referring to Fig. 1 of the drawings, 1 is a jar, and 2 is a cover for the jar.

The mouth end of the jar is surrounded by a seat, 3, which seat is surrounded by a peripheral flange, 4, said seat, 3, and flange, 4, being separated by a groove, 5.

The inner surface of the cover, 2, is adapted to rest upon the seat, 3, said cover having on its inner side a peripheral flange, 6, adapted to occupy the groove, 5, and preferably having also an inwardly projecting circular flange, 7, adapted to enter within the mouth of the jar.

The outer side of the cover is formed with a central boss, 8, surrounded by a seat, 9, and the flange, 4, on the jar extends upwardly above the plane of the seat, 3, on the jar, so that its outer end is flush with said seat, 9, on the cover.

The bottom of the jar is formed with a recess, 10, surrounded by a seat, 11.

The boss, 8, on the cover of the jar is adapted to freely enter the bottom recess $10^a$, in another jar, $1^a$, similar to the jar, 1; and the seat, 9, on the cover, and the outer end, 12, of the flange, 4, on the jar are adapted to form a support for the recess-surrounding bottom-seat, $11^a$, of said similar jar, $1^a$.

Covered jars as above described can thus be stacked one upon another for convenience in storage in the manner illustrated in Fig. 1.

The outer peripheral surface $2^a$, of the cover, 2, and the inner wall of the flange, 4, on the jar are divergent outwardly one from the other, forming therebetween an inwardly tapered groove, 13, communicating with the groove, 5, and adapted to receive a sealing medium such as paraffin, which can be run into said grooves, 13, and 5, in melted form and then permitted to harden, thus making a sealed connection between the peripheral portion of the cover and the mouth of the jar.

We have shown the cover provided with a perforate opening shown in Figs. 1, 2 and 3, as an opening, 16, adapted to receive a tapered plug or cork, 14, which plug or cork is provided with an axial aperture, 15, as shown in Fig. 2.

This plug or cork is made of yielding material, such as soft rubber, whereby when it is driven tightly into the aperture, 16, said yielding material will be compressed to tightly close the aperture, 15.

After the jar has been substantially filled with fruit, 17, or the like, and the sealed connection has been made as above described between the edge-portion of the cover and the mouth of the jar, any air remaining within the jar is substantially extracted by means of an air pump or suction-device, 18, applied to the plug or cork, 14, which plug for this purpose is inserted into the opening, 16, in the cover, but not so tightly as to close the aperture, 15, in the plug.

After the air has been sufficiently exhausted from the jar, the plug or cork, 14, is driven tightly into the opening, 16, in the cover to close the aperture, 15, in the plug or cork, and to thus finally seal the jar.

We have shown the cover provided with a recess, 19, in its inner surface adapted to receive when desired, a tight-fitting tablet, 20, which may be impregnated or saturated with brandy or other flavoring substance.

We have shown the outer side also of the cover provided with a recess, 21, adapted to receive a tight-fitting tablet, 22, upon which may be written or printed the name of the contents of the jar.

The inner surface of the tablet, 22, may be coated with paraffin or similar sealing medium, whereby the tablet will form a sealed cover for the opening, 16, in the cover of the jar.

The tablet, 20, may be provided with a central aperture registering with the opening, 16, in the cover of the jar to permit the air to be exhausted as above described.

In Figs. 4 and 5, the plug or cork, 14, is omitted and the cover of the jar is shown provided with an opening, 23, much smaller than the opening, 16, shown in Figs. 1, 2 and 3, and the air is exhausted by means of a rubber bulb, 24, applied to the outer end of said opening, 23, after which the bulb is quickly withdrawn and replaced by the paraffin-coated tablet, 22, to finally seal the jar.

In the construction shown in Fig. 6, the jar is formed without the groove, 5, and the flange, 6, is omitted from the cover.

What we claim as new and desire to secure by Letters Patent is:

1. The combination with a jar having a mouth surrounded by a seat, and a peripheral flange surrounding said seat; of a cover adapted to rest upon said seat on the jar, the outer peripheral surface of said cover and the inner wall of said flange on the jar being outwardly divergent one from the other to form therebetween an inwardly tapered groove adapted to receive a sealing medium, said cover being wholly surrounded by said flange, and the mouth of said groove being open substantially continuously around said cover.

2. The combination with a jar having a mouth surrounded by a seat and a peripheral flange surrounding said seat, said seat and flange being separated by a groove surrounding said seat; of a cover adapted to rest on said seat on the jar, said cover having an edge-flange adapted to occupy said groove in the jar, the outer peripheral surface of the cover and the inner wall of said flange on the jar being outwardly divergent one from another to form therebetween an inwardly tapered groove communicating with said groove between said flange and said seat on the jar, said cover being wholly surrounded by said flange, and the mouth of said groove being open substantially continuously around said cover.

3. The combination with a jar having a mouth surrounded by a seat, and a peripheral flange surrounding said seat and having a bottom provided with a recess surrounded by a seat; of a cover adapted to rest upon said flange-surrounded seat, said cover having a boss, and surrounding said boss a seat substantially flush with the outer end of said flange on the jar, said boss being adapted to freely enter the bottom-recess in, and said seat on the cover and said outer end of said flange on the jar being adapted to form a support for the recess-surrounding bottom-seat of, another jar similar to the aforesaid jar.

4. The combination with a jar having a mouth surrounded by a seat, and a peripheral flange surrounding said seat, and having a bottom provided with a recess surrounded by a seat; of a cover adapted to rest upon said flange-surrounded seat, said cover having a boss, and surrounding said boss a seat substantially flush with the outer end of said flange on the jar, said boss being adapted to freely enter the bottom-recess in, and said seat on the cover and said outer end of said flange on the jar being adapted to form a support for the recess-surrounding bottom-seat of, another jar similar to the aforesaid jar, the outer peripheral surface of said cover and the inner wall of said flange on the jar being outwardly divergent one from the other to form therebetween an inwardly tapered groove adapted to receive a sealing medium.

5. A jar-cover adapted to close the mouth of a jar, and provided with a tablet-receiving recess in its inner side open to the interior of the jar, and with a tablet-receiving recess in its outer surface; in combination with tablets frictionally held in said respective recesses.

6. The combination with a jar-cover having a peripheral portion adapted to make sealed connection with the mouth of a jar and provided with a perforate-opening; of an apertured plug of yielding material adapted when loosely inserted in said opening in the cover to form a vent through said cover and plug, said plug having tapered engagement with said opening, whereby it is adapted when driven tightly into said opening to close the aperture in the plug and seal said opening.

In testimony whereof we have hereunto set our hands this 21st day of June, 1917.

WILLIAM C. MARTINEAU.
CLARENCE R. MARTINEAU.